Figure 1:
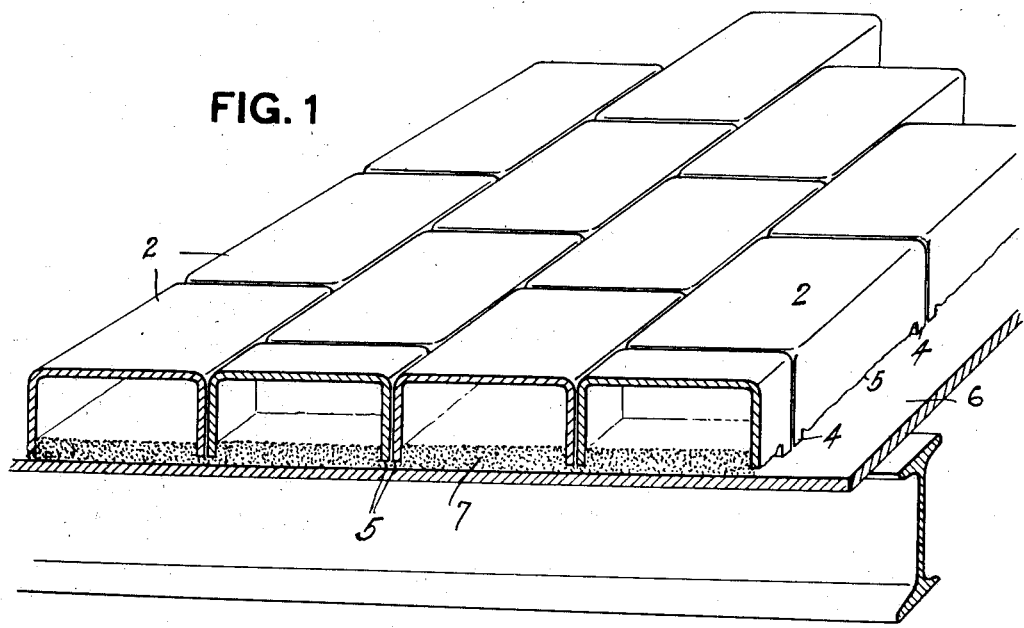

R. H. IRONS.
PAVING BLOCK.
APPLICATION FILED JUNE 5, 1919.

1,344,895.

Patented June 29, 1920.

INVENTOR
Robert H. Irons
By Kay Totten Powell
Attys

UNITED STATES PATENT OFFICE.

ROBERT H. IRONS, OF HARRISBURG, PENNSYLVANIA.

PAVING-BLOCK.

1,344,895.   Specification of Letters Patent.   Patented June 29, 1920.

Application filed June 5, 1919. Serial No. 301,952.

*To all whom it may concern:*

Be it known that I, ROBERT H. IRONS, a citizen of the United States, and a resident of Harrisburg, in the county of Dauphin and State of Pennsylvania, have invented a new and useful Improvement in Paving-Blocks; and I do hereby declare the following to be a full, clear, and exact description thereof.

My invention relates to a paving block and more especially to one adapted for use in connection with steel or like plants.

In open hearth steel plants the charging floors are subject to spills of liquid metal and slag as well as to severe vibration and pounding which causes rapid destruction of the floors when made of the flooring materials heretofore generally employed.

The steel plate charging floor of the ordinary open hearth plant is usually paved with bricks to protect it from such spills and runs of liquid metal. In case of an overflow or a breakout from an open hearth furnace the metal or slag overrunning the floor will fill the crevices in the brickwork, and thus make a firm bond with the pavement. In removing the metal and slag the bricks often stick to the same, causing the destruction of the pavement and often making the metal unfit for recharging into the furnace without breaking and separating it from the paving material. Furthermore, unless the pavement is promptly repaired after such overflow or breakout the vibration of the charging floor will have a disastrous effect on the paving adjacent to the original break. In cases when concrete is used as paving material it is bound to crack and disintegrate wherever the floor is subject to excessive heat from checker chambers or flues underneath the charging floor. A spill of liquid metal or slag will, of course, destroy or damage whatever portion of the concrete pavement it comes in contact with.

The vibration and pounding to which these pavements are subjected is caused chiefly by the advancing and withdrawing of the charging machines and charging trucks, and will sooner or later cause the pavement to crack and work loose from the steel flooring permitting dirt to work down through the cracks and underneath the pavement, thus raising and destroying the same.

These difficulties, therefore, make the maintenance of the charging floor quite a troublesome matter, and the object of my invention is to overcome these difficulties. To these ends my invention consists generally stated in a steel box, either pressed or cast, open on one side, and forming a paving block which is adapted to be laid with its open side down either directly on top of the steel plate charging floor or embedded in a layer of sand, fire-clay, cement or other suitable material, all as fully hereinafter set forth and claimed.

Figure 2:
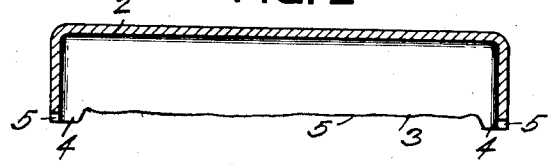
Figure 3:
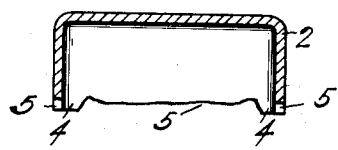
Figure 4:
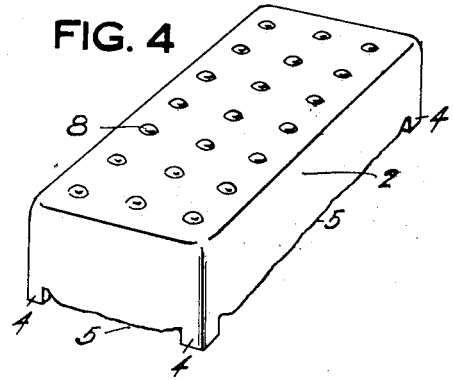

In the accompanying drawing Figure 1 is a perspective view of a portion of a floor composed of my improved blocks, the end blocks being shown in section; Fig. 2 is a longitudinal sectional view of one of the blocks; Fig. 3 is a cross section; Fig. 4 a perspective view; and Fig. 5 a modified form.

In the drawing the numeral 2 designates a block which is formed preferably of steel plate pressed to shape in suitable dies and forming a hollow box-like structure with the open side 3. In pressing this box from a plate of proper shape and in suitable dies the metal at the corners can be made to extend somewhat beyond the sides so that the feet 4 are provided which support the block, and as said feet extend beyond the sides and ends there will be spaces 5 furnishing access to the inside of the block. This will permit any surplus of dirt collecting in the joints between the blocks to work in under the blocks without any damage to the pavement, there being sufficient space inside the block to receive such surplus dirt without raising or bulging the pavement.

The blocks may be laid directly on the steel plate charging floor 6 without the use of any sand or other material, or said blocks may be set in a layer of clay, sand, or other suitable material 7. Where the heat is not excessive and the pounding of the floor not too great it may be advantageous to set the blocks in cement or concrete. The blocks are laid close to one another in the manner of laying bricks, and to prevent slipping the upper faces of the blocks should be riffled or studded as at 8.

On account of the fact that each block has considerable weight and at the same time very small bearing face on the floor proper, the blocks will stay in position and no binder is necessary to hold the blocks together or hold them down to the flooring, so that free expansion and contraction are always possible throughout the whole floor area.

Any dirt which works its way in under the blocks through the openings 5 can have no tendency to raise the block and cause unevenness due to the fact that the large open space inside the block is capable of taking care of any such dirt.

The blocks can readily be laid to make a level floor surface due to the small bearing areas at the corners only of the block, which design makes it possible to avoid resting the individual blocks on rivet heads or seams in the floor structure.

The pounding or vibration can do no damage to the pavement when no binding material is used, due to the weight of the blocks, the small bearing surface on the floor and the great strength of the individual blocks. Furthermore, when no binding material is used it is possible to readily replace individual blocks and any damage to the pavement can be quickly and readily repaired, while the damaged blocks when removed have a value as scrap, and where they are used on an open hearth charging floor they may be charged directly into the furnace.

The blocks may be made of scrap plate and so produced at low cost, although I do not wish to limit myself to boxes made of plate metal as the boxes might be cast if desired.

It will, of course, be apparent that any spills of metal or slag on a floor of this character will not do any great amount of damage, as the slag is easily removed and any metal that sticks to the pavement may readily be lifted from the floor together with the paving blocks and, if desirable, charged directly into the furnace including the blocks, which latter can be replaced with little trouble.

Figure 5:
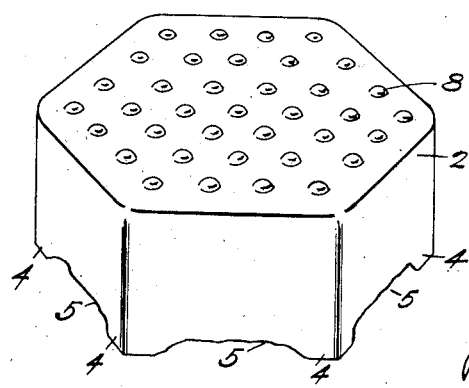

In Fig. 5 I have shown a block of hexagonal form and it is apparent that any other suitable form may be adapted.

What I claim is:

1. A hollow unfilled paving block consisting of a box of regular shape having the bottom open and provided with means for furnishing communication with the interior of the block when the block is in position.

2. A hollow unfilled paving-block formed of metal, having one open side, the metal at the corners projecting slightly beyond the sides and ends to form openings communicating with the interior of the block when the block is in position.

3. A hollow unfilled paving-block formed of metal, having one open side and feet at the corners projecting beyond the sides and ends of the box, forming openings communicating with the interior of the box when the block is in position.

4. A hollow unfilled paving-block formed of metal, having one open side and reduced wall portions whereby when said block is laid open side down said reduced portions form openings communicating with the interior of said block.

In testimony whereof I, the said ROBERT H. IRONS, have hereunto set my hand.

ROBERT H. IRONS

Witnesses:
 WM. BROWN,
 GUST. L. FISK.